(12) United States Patent
Bußer et al.

(10) Patent No.: US 7,787,441 B2
(45) Date of Patent: Aug. 31, 2010

(54) COMMUNICATION SYSTEM, METHOD FOR REGISTERING A COMMUNICATION RELATIONSHIP AND GATEWAY COMPUTER

(75) Inventors: Jens-Uwe Bußer, München (DE); Markus Böhm, München (DE); Steffen Fries, Baldham (DE); Wolfgang Klasen, Ottobrunn (DE)

(73) Assignee: Siemens Aktiengesellschaft, Munich (DE)

( * ) Notice: Subject to any disclaimer, the term of this patent is extended or adjusted under 35 U.S.C. 154(b) by 914 days.

(21) Appl. No.: 11/042,871

(22) Filed: Jan. 25, 2005

(65) Prior Publication Data
US 2005/0169251 A1 Aug. 4, 2005

(51) Int. Cl.
*H04L 12/66* (2006.01)
*H04L 12/28* (2006.01)
*H04L 12/56* (2006.01)

(52) U.S. Cl. ........................ 370/352; 370/401
(58) Field of Classification Search ........................ None
See application file for complete search history.

(56) References Cited

U.S. PATENT DOCUMENTS

| | | | | |
|---|---|---|---|---|
| 6,031,896 | A * | 2/2000 | Gardell et al. | 379/88.17 |
| 6,654,366 | B1 * | 11/2003 | Ketcham | 370/352 |
| 6,985,957 | B2 * | 1/2006 | Fujita | 709/229 |
| 7,031,450 | B2 * | 4/2006 | Evslin | 379/220.01 |
| 7,114,180 | B1 * | 9/2006 | DeCaprio | 726/18 |
| 7,185,359 | B2 * | 2/2007 | Schmidt et al. | 726/2 |
| 2002/0064151 | A1 * | 5/2002 | Sorrentino | 370/352 |
| 2003/0005280 | A1 | 1/2003 | Bobde et al. | |
| 2003/0106067 | A1 * | 6/2003 | Hoskins et al. | 725/119 |
| 2003/0169859 | A1 | 9/2003 | Strathmeyer et al. | |
| 2005/0073964 | A1 * | 4/2005 | Schmidt et al. | 370/260 |
| 2005/0240765 | A1 * | 10/2005 | Genty et al. | 713/175 |

FOREIGN PATENT DOCUMENTS

| | | |
|---|---|---|
| DE | 198 33 969 A1 | 2/2000 |
| EP | 1 267 548 A2 | 12/2002 |
| WO | WO 01/82551 A2 | 11/2001 |

OTHER PUBLICATIONS

VCON White Paper H.323 Standard, Jan. 1998.*
ITU-T SG16: "H.235—Security and Encryption for H-Series (H.323 and other H.245-based) Multimedia Terminals (H.235v3)", ITU-T Recommendation; Online—Retrieved from Internet: URL:222.itu.int/itu-t on Apr. 18, 2005; Aug. 2003; pp. 1-118.
P. Srisuresh, J. Kuthan, J. Rosenberg, A. Molitor, A. Rayhan, "RFC 3303—Middlebox Communication Architecture and Framework", IETF Request for Comments, Aug. 2002, pp. 1-34.

(Continued)

*Primary Examiner*—Ayaz R Sheikh
*Assistant Examiner*—Blanche Wong

(57) ABSTRACT

A communication system is proposed which, as its communication elements (KE) has a gatekeeper (GK), a gateway (GW) coupled to the gatekeeper (GK) and at least one communication unit (KEH) coupled to the gateway (GW), with the communication system being set up so that, to register a communication relationship of the communication unit (KEH) in the communication system (KS), a request message (ANF) is transmitted from the communication unit (KEH) via the gateway (GW) to the gatekeeper (GK), which is checked in the gateway (GW) for authenticity and in the gatekeeper (GK) for authorization.

18 Claims, 8 Drawing Sheets

OTHER PUBLICATIONS

J. Rosenberg, H. Schulzrinne, G. Camarillo, A. Johnston, J. Peterson, R. Sparks, M. Handley, E. Schooler: "SIP: Session Initiation Propcol", IETF Request for Comments, Jun. 2002, pp. 1-269. RFC 3261.

ITU-TSG-16 Q11: "Packet-based Multimedia Communications Systems", ITU-T H.323, Nov. 2000, pp. 1-257.

Mary R. Thompson, Abdelilah Essiari and Srilekha Mudumbai, "Certificate-Based Authorization Policy in a PKI Environment", ACM Transactions on Information and System Security, Nov. 28, 2003, pp. 566-588, vol. 6, No. 4.

Jochen Nölle, "Voice Over IP, Grundlagen, Protokolle, Migration", 2003, pp. 1-16, 179-194, ISBN 38007-2708-0, VDE Verlag GmbH, Berlin, Offenbach, Germany.

IEEE 802.1X-2004: "IEEE Standard For Local and Metropolitan Area Networks—Port-Based Network Access Control"; Dec. 13, 2004, pp. 37-40; New York; IEEE; 0-7381-4528-8.

H. Krawczyk, M. Bellare, R. Canetti, RFC2104 Request for Comments Network Group, "HMAC: Keyed-Hashing for Message Authentication", Feb. 1997, pp. 1-11.

* cited by examiner

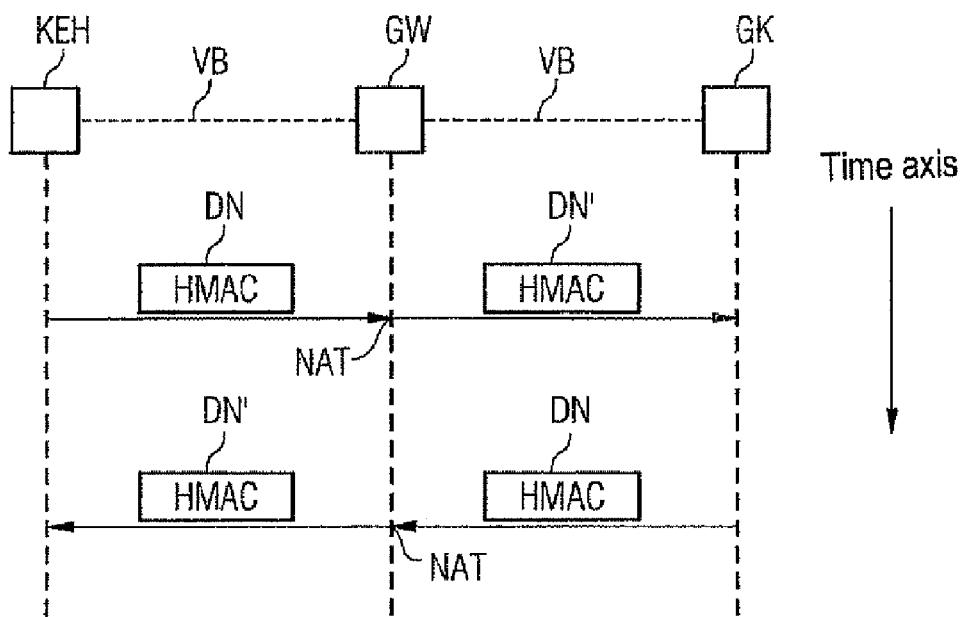

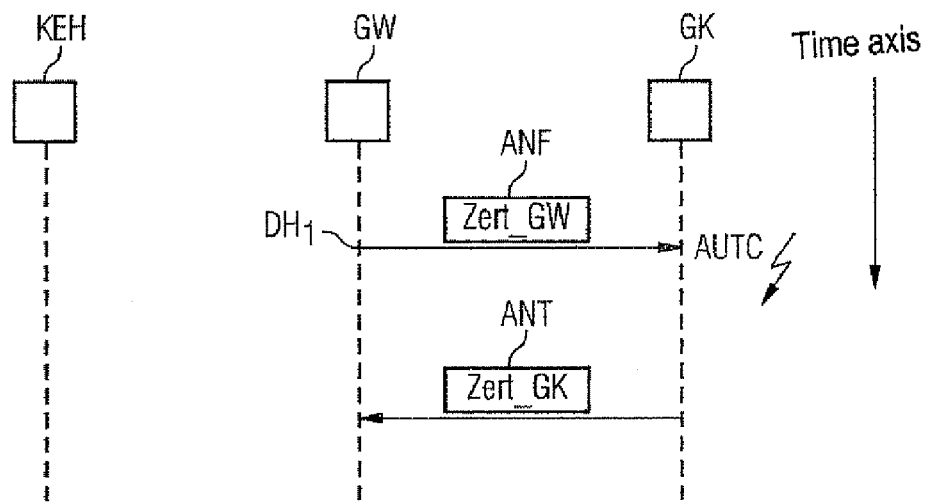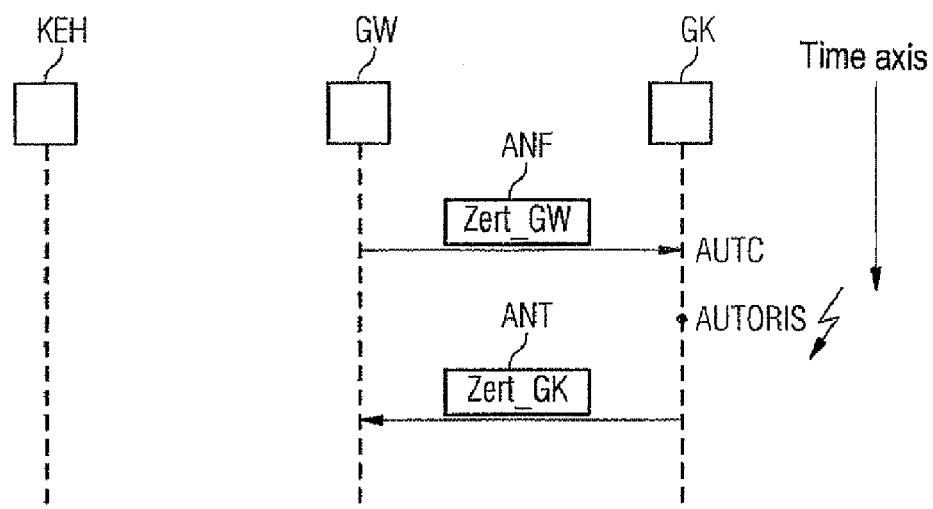

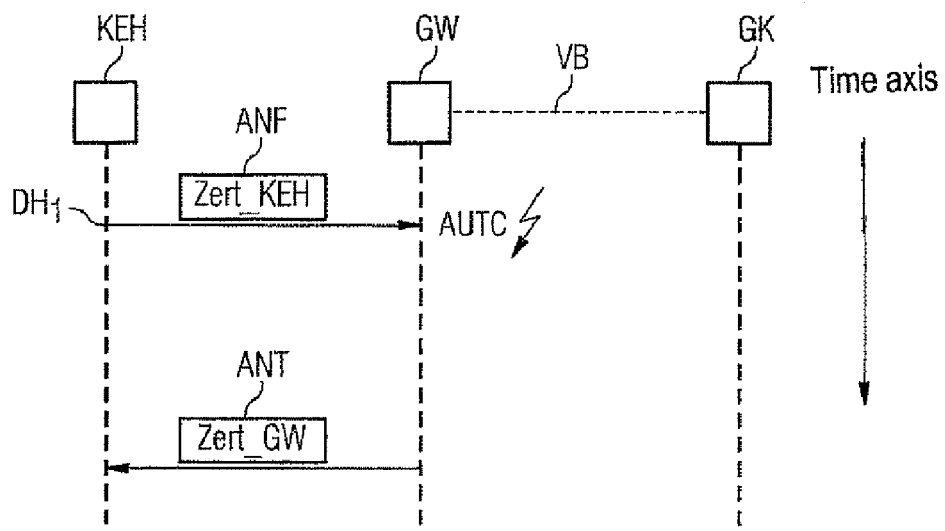
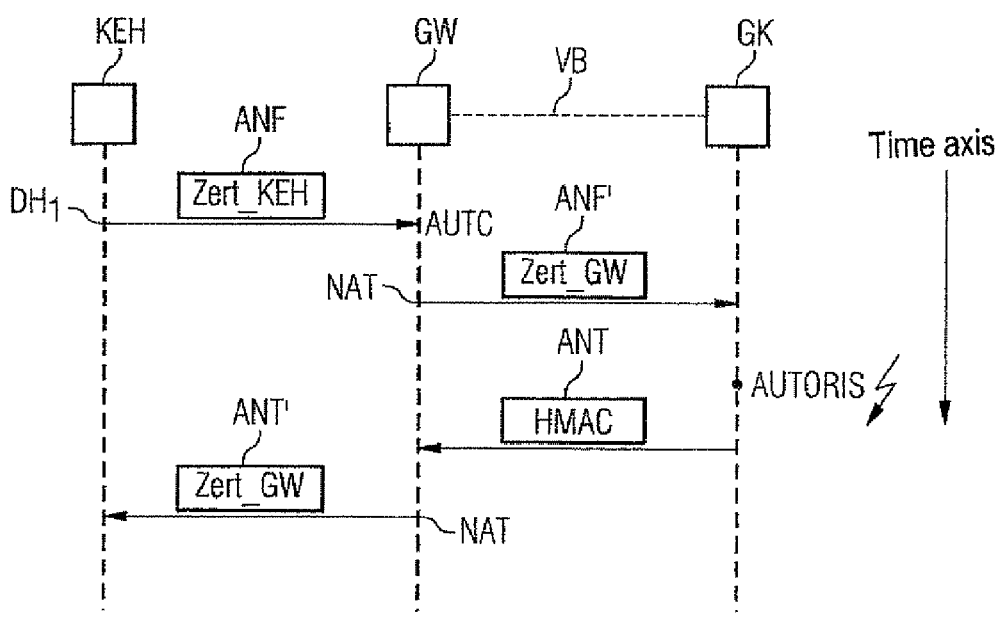

COMMUNICATION SYSTEM, METHOD FOR REGISTERING A COMMUNICATION RELATIONSHIP AND GATEWAY COMPUTER

CROSS REFERENCE TO RELATED APPLICATIONS

This application claims priority to the German application No. 10 2004 004 048.6, filed Jan. 27, 2004 and which is incorporated by reference herein in its entirety.

FIELD OF INVENTION

The invention relates to a communication system featuring as its communication elements a gateway coupled to a gatekeeper and at least one communication unit connected to the gateway. The invention further relates to a method for registering a communication relationship in such a communication system and also to a gateway.

BACKGROUND OF INVENTION

In ITU Standard H.235 (published in ITU-T Recommendation H.235 Version 3 "Security and Encryption for H-Series (H.323 and other H.245 based Multimedia Terminals") security mechanisms are defined for a packet-oriented network communication. Integrity and authenticity of the registration and signalling data are ensured here by cryptographic checksums by including a shared secret. If an error occurs during the checking of a cryptographic checksum the messages, which also contain address information, are rejected.

In what is known as the "baseline profile" in accordance with H.235 Annex D a communication unit and a call control computer, referred to hereafter as a gatekeeper, authenticate themselves by means of a password which has been administered beforehand. In the "hybrid profile" in accordance with H.235 Annex F the communication unit and the gatekeeper use digital signatures and certificates for registration. To protect the integrity of the further messages which follow successful registration a shared secret is negotiated dynamically during registration using the Diffie-Hellman method.

In a communication system featuring a gatekeeper, a gateway and at least one communication unit, the authentication and authorization of the communication unit are normally undertaken by the gatekeeper while the gateway forwards the messages without modification from the communication unit to the gatekeeper.

Problems arise if the communication unit and the gatekeeper are in different communication networks with incompatible IP address ranges. In this case the IP address in the messages is converted by means of what is known as Network Address Translation (NAT) by the gateway which establishes the connection between the two communication networks. As a result of the conversion of the IP address the cryptographic checksum no longer matches the changed message, in which case it is rejected by the gatekeeper. To avoid this the checksum must be replaced by the gateway, for which purpose the latter would need the shared secret of the communication unit and the gatekeeper.

In the situation described the gateways would have to be given access to a database system with which the gatekeeper is connected for checking the authorization so that, for the conversion of the IP address, a new correct checksum can be calculated by the gateway. In this case both the authentication and also the authorization data are checked by the gateway.

The disadvantage of this method of operation is the necessity for an interface to the database at the gateway. Where the communication system features a plurality of such gateways which each connect two different communication networks to each other and each perform a conversion of the IP address, the checking for authorization and authentication would have to be undertaken in each of the gateways. This means that each of the plurality of gateways would need access to the data of the user database.

SUMMARY OF INVENTION

The object of the present invention is therefore to create a communication system and a method for registering a communication relationship in a communication system which guarantees high security with low administration effort.

This object is achieved by the claims.

The communication system in accordance with the invention is set up so that, to register a communication relationship of the communication unit in the communication system, a request message is transmitted from the connection unit via the gateway to the gatekeeper which is checked in the gateway for authenticity and in the gatekeeper for authorization.

The method in accordance with the invention features the following steps: Transmission of a request message from the communication unit to the gatekeeper via the gateway; Authentication of the request message by the gateway; Forwarding of the request message to the gatekeeper if the outcome of the authentication is positive; Checking the authorization data of the request message by the gatekeeper, and transmission of a response message to the communication unit sending the request message.

The gateway in accordance with the invention is set up so that a request message to be forwarded from a communication unit to a gatekeeper is only checked for its authenticity and is only forwarded if it is positively authenticated.

Advantageous embodiments are produced by the dependent patent claims.

The basic principle of the invention consists of dividing the checking between authenticity and authorization. Whereas a request message is authenticated in a gateway, authorization is only undertaken when the request message is routed to the gatekeeper. The advantage of this procedure is that a connection only has to be established to the gatekeeper with a connection to a database in which user-related data for checking an authorization is held. This data does not however need to be made available to any intermediate gateway since no further user-related data is needed for authenticity checking. The authenticity can be established just from information to be found in the request message.

The invention can advantageously be used if the communication unit and the gatekeeper are assigned to different communication networks, with the relevant IP addresses being converted by a gateway. This conversion is referred to as Network Address Translation (NAT). Since cryptographic checksums are transmitted during the transmission of a request message to safeguard integrity and authenticity, the checksum is also modified during the conversion of the IP address. Since the checksum of the request message is checked by the gateway connected to the communication unit and authentication thus undertaken, the message for address translation can be easily modified since this original checksum or signature is no longer needed for checking the authorization data in the gatekeeper.

Advantageously the communication unit represents a processor or a further gateway which is coupled to at least one further communication unit. The method in accordance with the invention can thus be used equally well for registering a computer (hardware or software on a computer) or a further gateway. A plurality of gateways connected in series serve to connect a corresponding plurality of communication networks to each other, with a gateway undertaking address translation between two communication networks in each case.

Preferably two of the communication elements are connected to each other in an established communication system by a trust relationship. The term "established" here means that such communication elements are already authenticated and authorized so that messages can then be transferred with greatly simplified checks. Thus in particular there does not need to be any authorization of the message of the communication unit, whereas there is authentication of the subsequent data messages as well.

The trust relationship can for example be represented by a (pre-administered) password or a secret formed according to the Diffie-Hellman method. Preferably each trust relationship is represented by a password or a secret formed according to the Diffie-Hellman method. In other words this means that the password or the secret can differ between each pair of communication elements. Preferably there is only a trust relationship after a previous positive authentication and positive authorization by the gatekeeper.

Preferably a message is transmitted between two communication elements using a digital certificate, provided there is not yet a trust relationship between the two communication elements. For this purpose each communication element has a personal certificate or a private key. Furthermore each communication element has at least one root certificate with which the personal certificate of the connected communication element is or are signed. Despite an address translation and thereby modification of the data to be transferred, this allows the authenticity of a message which was transmitted by an adjacent communication element to be checked.

The invention advantageously only enables each communication element to know the addresses of the communication elements connected to it. This method of operation makes administration of the overall communication system significantly easier.

In accordance with an advantageous embodiment of the inventive method a trust connection is set up between the gateway and the gatekeeper before the transmission of the request message. The trust relationship is set up, as described above, using a digital certificate. For this purpose the gateway connected to the gatekeeper sends a request message to the latter which will be authorized and authenticated by the gatekeeper. Provided both these checks yield positive results, the gatekeeper transmits a response message to the gateway, with a secret being agreed at the same time. This represents the basis for the trust relationship which then exists.

The request message sent by the communication unit to the gatekeeper is forwarded using the trust relationship, i.e. the secret negotiated between the gateway and the gatekeeper.

Preferably the data is transmitted between two communication elements between which there is not as yet a trust relationship using certificates and data is transmitted between two communication units between which there is already a trust relationship using a secret or a password.

For efficient setup of a communication system it is useful to establish a trust relationship, starting from the gatekeeper, in the direction of gateways further on from it or in general with communication elements. In a communication system with a plurality of gateways, these must have therefore set up a trust relationship with the gateway before a communication unit wishes to register itself or with the communication system. In this case merely the transmission of the request message from the communication unit of to the unit connected with this gateway must be handled using a certificate. This means that the gateway connected to the communication unit checks the authenticity of the request message. If the request message can be forwarded via the gateway or the plurality of gateways directly—possibly with the relevant address translation—to the gatekeeper without a further check on the authenticity of the communication unit needing to be undertaken by the gateways located between the two. This only applies however are if all the gateways in the communication link have already established a trust relationship with the gatekeeper.

Preferably the plurality of gateways are registered in turn, beginning with the gateway connected to the gatekeeper.

In a further advantageous embodiment, after a positive authentication and authorization, a further step is to set up a trust link between the communication unit sending the request message and the gateway connected to this unit. After such a trust relationship has been established the communication unit can transmit messages to be gatekeeper using simple cryptographic methods.

In a further embodiment of the method in accordance with the invention the request message is at least partly modified on transmission from the communication unit to the gatekeeper by the gateway. The mortification of the data preferably includes the translation of the relevant IP addresses in this case. Expediently the response message is checked for authenticity by the communication unit. during transmission from the gatekeepers to the communication unit.

Thus the invention can be presented as follows: The basic principle consists of subdividing authentication and authorization of a communication unit registering in the communications system. During the authentication of the request message sent by the communication unit to the gateway connected to it, authorization is undertaken by the gatekeeper. Stated in more precise terms this means that the communication unit will be authenticated by the gateway which already has a security relationship to a gatekeeper because of its previous registration with said gatekeeper. The gateway subsequently forwards a modified request message, where necessary via a further gateway, to the gatekeeper. Preferably a special code is used, since this process does not involve a standard message but a modified one. The authentication is finally checked at the gatekeeper, which is separated from the communication unit by one or by a plurality of gateways. The response message of the gatekeeper is then transmitted via the chain of gateways to the gateway connected to the communication unit. This gateway responds to the request message of the communication unit with a standardized response message, the authenticity of which the communication unit can check. With this process known as a "handshake", Diffie-Hellman parameters are exchanged for example between the communication unit and the gateway connected to it in the case of a successful registration. A shared secret is computed from these parameters so that now a security relationship also exists between the communication unit and the gateway connected to it and thereby to the gatekeeper as well.

The advantages of the method in accordance with the invention consist of a secured registration of a communication unit in a communication system even if a plurality of address translations take place in the system. The administration of the communication system is made easier since only one single database with user-related data is necessary, with this alone being connected to the gatekeeper. A communication system such as the one described above does not require any technical changes to be made to a communication unit. The effort involved in authentication, especially signature and expensive Diffie-Hellman computations, is relocated almost entirely to the relevant gateway from the central gatekeeper used previously.

BRIEF DESCRIPTION OF THE DRAWINGS

The invention and its benefits will be explained in more detail below with reference to the Figures. The diagrams show.

DETAILED DESCRIPTION OF INVENTION

The exemplary embodiments described below of various communications systems are preferably used for IP (Internet Protocol)-based telephony.

Figure 1:
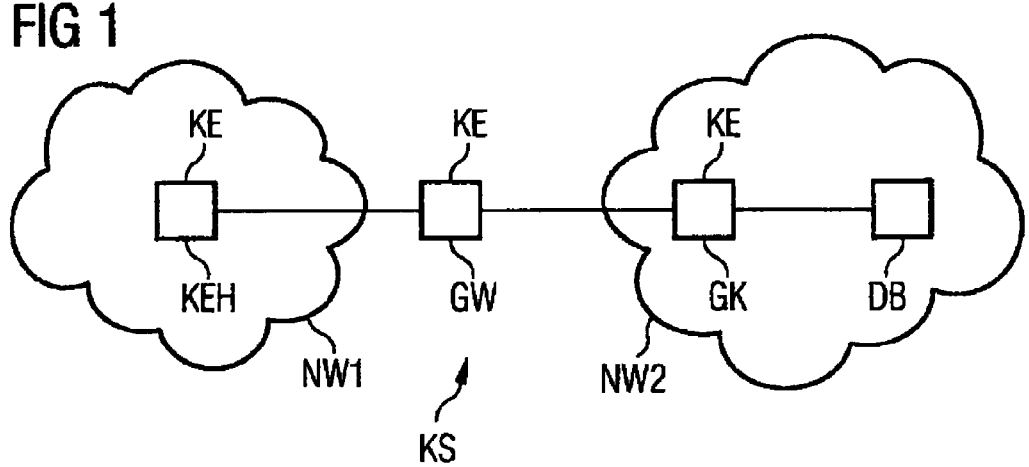
FIG. 1 an inventive communication system in a first exemplary embodiment.

FIG. 1 shows the simplest form of an inventive communication system KS in a first exemplary embodiment. As its communication elements KE the communications system KS in accordance with the invention features a communication unit KEH, a gateway GW, a gatekeeper GK and a database DB. The database DB which contains a user-specific information about the communication unit KEH is in accordance with the invention exclusively connected to the gatekeeper GK. It contains authorization data such as for example the certificates of all communication units and gateways.

The communication unit KEH is assigned to a first communication network NW1. The gatekeeper GK and the database DB connected to it are assigned to a second communication network NW2. The relevant communication elements in the first or second communication network NW1, NW2 can work on the basis of different protocols. The gateway GW which connects the communication elements of the first communication network NW1 to the communication elements of the second communication network NW2 handles protocol conversion and translation, especially conversion of the addresses, formats, codes etc. The gateway operates on the smallest shared layer of the communication networks to be connected. The gateway can be addressed as a network node and accessed by the first and the second communication network NW1, NW2.

Unlike the diagram shown in FIG. 1, the first communication network NW1 can feature a plurality of communication units KEH which are connected to each other and/or to the gateway GW. The same applies to the second communication network NW2.

For the registration of a communication unit in accordance with the invention at the gatekeeper each communication element KE needs a personal certificate and the private key which matches it. In addition each communication element KE needs a root certificate with which the personal certificate of each immediately adjacent communication element has been signed. As regards the first exemplary embodiment of FIG. 1, this means that the communication unit KEH features the root certificate of the gateway GW and personal certificate Zert_KEH. The gateway GW features a personal certificate Zert_GW and the root certificate of the communication unit KEH and of the gatekeeper GK. The gatekeeper a personal certificate Zert_GK as well as the root certificate of the gateway GW. A relevant root certificate is used for checking the validity of the personal certificate.

To ensure smooth transmission of messages between the relevant communication elements, instead of the address of the gatekeeper GK, the communication unit KEH needs the address of the gateway GW connected to the communication unit KEH. This gateway in its turn needs the address of the next network communication processor in each case, if there is one. Only the gateway GW connected to the gatekeeper GK receives the address of the gatekeeper GK.

FIGS. 2 through 9 describe various execution sequences of the setup and operation of the inventive communication system in accordance with the first exemplary embodiment as shown in FIG. 1.

Figure 2:
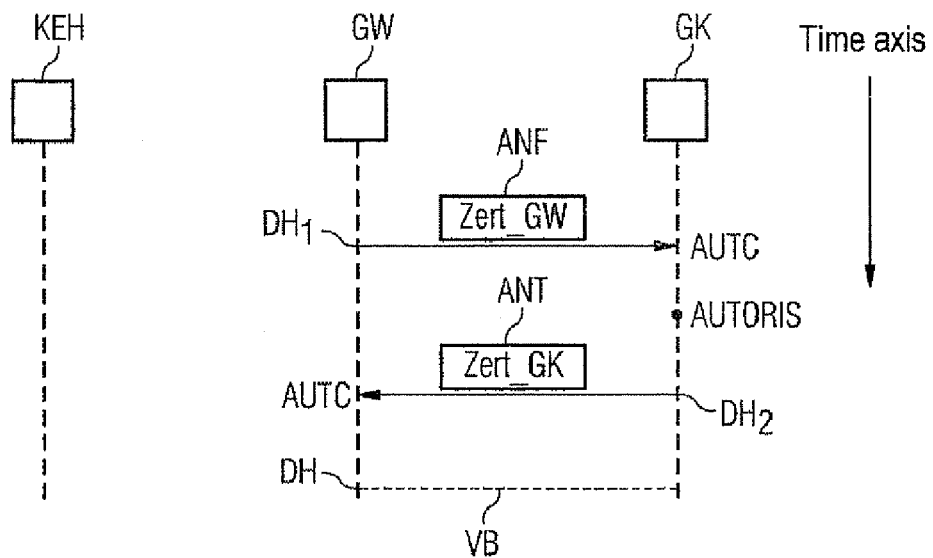
FIG. 2 the registration of a gateway at a gatekeeper for establishing a trust relationship in the first exemplary embodiment, FIG. 3 the registration of a communication unit at a gatekeeper in the first exemplary embodiment, FIG. 4 the comparison of two tables using H.235 data fields as an example which shows the fields transferred in the request message and how they are modified by the gateway during the registration at a gatekeeper, FIG. 5 the transmission of a data message from a registered communication unit to a gatekeeper after positive authentication and authorization in the first exemplary embodiment, FIG. 6 the execution sequence of a failed registration of a gateway in the first exemplary embodiment, FIG. 7 the execution sequence of a failed registration of a gateway in the first exemplary embodiment, FIG. 8 the execution sequence of a failed registration of a communication unit in the first exemplary embodiment, FIG. 9 the execution sequence of a failed registration of a communication unit in the first exemplary embodiment, FIG. 10 a communication system in a second exemplary embodiment with gateways arranged in parallel for improved distribution of the load, FIG. 11 a communication system in a third exemplary embodiment with a plurality of network communication processors coupled to each other in series, FIG. 12 the registration of a communication unit in the third exemplary embodiment, with a trust relationship already existing between the relevant gateways and the gatekeeper, FIG. 13 the transmission of a data message from a registered communication unit to the gatekeeper in the third exemplary embodiment, FIG. 14 the failed registration of a communication unit in a third exemplary embodiment and FIG. 15 the failed registration of a communication unit in the third exemplary embodiment.
Figure 3:
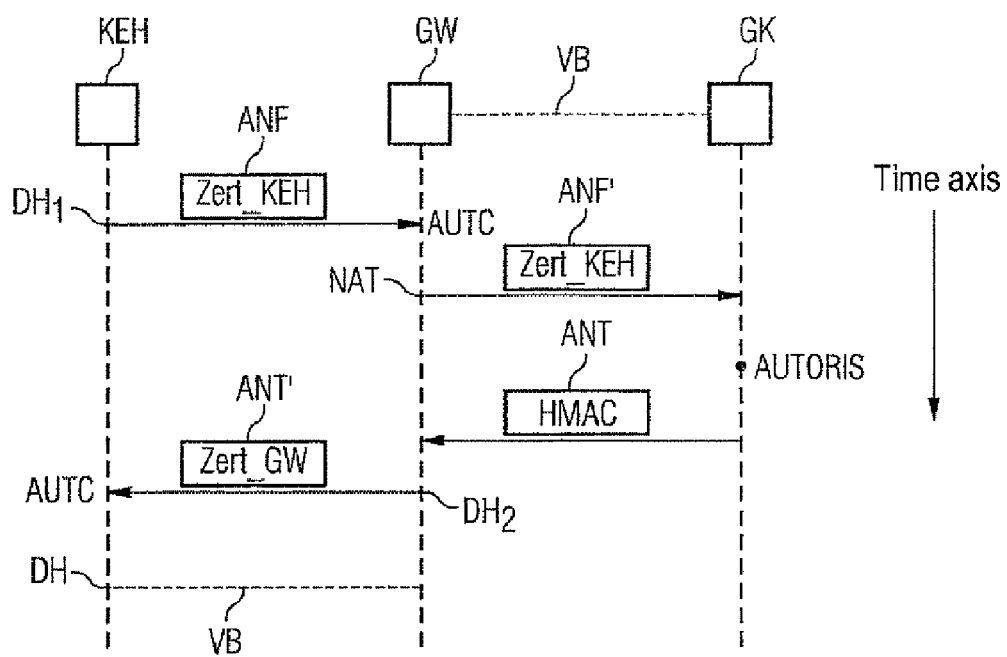

For a fast and efficient registration of a communication unit in an inventive communication system KS the first requirement is to enable data to be transmitted quickly and easily between the gateway GW and the gatekeeper GK. For this purpose it is expedient for the gateway GW to first register at the gatekeeper GK. The timing sequence and the security mechanisms used in this operation are shown in FIG. 2. The gateway GW sends to the gatekeeper GK a request message ANF which is signed by means of the personal certificate of the gateway ZertGW. This message additionally contains what is known as a Diffie-Hellman halfset, including items such as the public parameters for the Diffie-Hellman method (identified by the reference characters $DH_1$). Positive authentication (AUTC) is followed by the authorization (AUTORIS) of the gateway, in which the gatekeeper GK searches the database DB connected to it for the corresponding entries. If the authorization was positive, the gatekeeper GK sends a response message ANT signed with its personal certificate Zert_GK to the gateway GW, with a Diffie-Hellman halfset also being sent (reference characters $DH_2$) to generate a shared secret between the gateway GW and the gatekeeper GK. The response message ANT is checked for authenticity using the root certificate of the gatekeeper GK present in the gateway GW. If this check was successful, the Diffie-Hellman method is used to compute a secret (reference characters DH) which forms the basis of the trust relationship VB.

Where a trust relationship exists in the subsequent Figures between two adjacent communication elements, this is shown by a broken line and has been established in accordance with the process described above.

The existence a trust relationship VB now makes it possible to send a message between the gateway GW and the gatekeeper GK without the use of the certificates. Instead it is possible to refer back to the negotiated secret, which simplifies and considerably speeds up the checking of a message.

This method of operation is referred to as a hybrid profile in Standard H.235 Annex F, in that the connection is first set up by means of certificates and further communication is undertaken by means of a secret using the HMAC (Hash Based Message Authentication Code). This is a mechanism for authentication of messages specified in RFC2104 which uses cryptographic hash functions. HMAC can be used in conjunction with a secret shared-use key with any given cryptographic one-way hash function, e.g. SHA-1 (Secure Hash Algorithm). The cryptographic strength of the HMAC depends on the characteristics of the underlying hash function.

After a trust relationship has been established between the gateway GW and the gatekeeper GK, the registration of the communication unit KEH in the communication system KS, especially at the gatekeeper GK can be undertaken. This process is shown in more detail in FIG. 3. For this purpose the communication unit KEH transmits a request message ANF, supplemented by a Diffie-Hellman halfset $DH_1$ and signed by means of its personal certificate Zert_KEH, to the gateway GW. The latter authenticates the request message ANF in accordance with the inventive method. It is possible for it to do this because of the availability of the root certificate of the communication unit KEH. If the authentication is positive, it forwards the request message, modifying at least a part of the data (NAT), to the gatekeeper GK. The modified message ANF' is encrypted in this case using the HMAC encryption method. The modification of the data relates especially to the translation of the address.

This is described in greater detail with reference to FIG. 4 using the H.235 Standard as an example. FIG. 4 shows two address tables with identical message fields which are some of the fields included in the request message ANF. The fields comprise the message type, sender IP address, destination IP address, time, sequence number, general ID, DH halfset, certificate, algorithm OID and signature.

If the gateway GW receives a request message ANF, some of the checks that it makes (in any order) are as follows:

Does T_KEH lie within the time window?
Is a root certificate for checking the certificate Zert_KEH present?
Is the signature of the message correct?
Is the signature of the certificate Zert_KEH correct?

This means that all checks are made except for the permissibility of the profile for the communication unit, since the data from the database DB is needed for this and the gateway GW has no access to this data. If one of these checks fails the communication unit is rejected by means of a signed response message ANT (FIG. 8). The request message is in this case not forwarded to the gatekeeper GK.

The gateway GW will overwrite at least some of the fields described in conjunction with FIG. 4 since the IP addresses are different in the second communication network NW2. In addition the recipient must be able to distinguish the modified request message ANF', as to whether it is a conventionally signed or "modified" request message. This is indicated by a modified algorithm OID.

If in the exemplary embodiment shown in FIG. 1 the gatekeeper GK receives such as modified request message ANF' (FIG. 3) some of the checks that it makes are as follows:

Does the parameter T_GW lie within the time window?
Is the sequence number R_GW in order?
Is the HMAC of the modified request message ANF' correct?

If all checks are in order, the gatekeeper GK, in order to check the authorization, requests from the database DB the profile of the communication unit KEH initiating the request message. This profile assigned to the communication unit contains information which uniquely identifies the permitted certificate of the communication unit, either the certificate or for example the serial number and the name of the issuer.

The gatekeeper now transmits a response message—depending on the result of the checks—in the H.235 baseline profile, which uses the HMAC, to the gateway GW. The gateway GW in its turn, as described above, modifies the data (NAT), adds a DH halfset $DH_2$ and transmits the modified response message ANT' with the assistance of its private certificate Zert_GW to the communication unit KEH. The communication unit KEH checks the modified response message ANT' for authenticity. If the check was successful a shared secret is calculated from the DH halfset received with the gateway GW (reference characters DH). The integrity of the modified response message is protected by means of the digital signature using Zert_GW.

After a trust relationship now exists between the communication unit KEH and the gateway GW as well as between the gateway GW and the gatekeeper GK, all further data messages are protected by the simpler method in accordance with HMAC. It should be emphasized here that the trust relationships VB shown in FIG. 5 each refer back to different secrets.

FIGS. 6 and 7 show the execution sequence of a failed registration of a gateway GW to the gatekeeper GK. In accordance with FIG. 6 the registration fails, since the authentication criteria mentioned in connection with FIG. 4 were not fulfilled. In this case there is no check for authorization by the gatekeeper. Instead a corresponding response message is transmitted using the certificate Zert_GK, to the gateway GW which in its turn undertakes an authentication check. In the response message the gateway is informed about the rejection of the registration.

By contrast the check for authenticity in the example shown in FIG. 7 is positive but an error occurs during checking for authorization. In this case too the gateway is informed by a response message about the failure of the registration.

In both cases of FIGS. 6 and 7 the transmission of a DH halfset on the part of the gatekeeper GK is dispensed with since the processing of a shared secret is not necessary.

FIGS. 8 and 9 assume that a trust relationship VB already exists between the gateway GW and the gatekeeper GK. The request message ANF is transmitted from the communication unit to the gateway GW and the authentication criteria are checked as described in conjunction with FIG. 3. Since one of the authentication criteria was not fulfilled however there is no modification and forwarding of the request message to the gatekeeper GK in FIG. 8. Instead a response message is returned to the communication unit by the gateway GW, signed with the aid of the certificate Zert_GW. No Diffie-Hellman halfset is transferred either.

By contrast the check for authentication of the request message ANF by the gateway GW is positive in FIG. 9. The message is modified and forwarded to the gatekeeper GK which undertakes the authorization check described above. If this check fails the gatekeeper GK transfers a response message ANT to the gateway using HMAC. The latter modifies the message and forwards this using a certificate Zert_GW to the communication unit KEH which authenticates the modified response message ANT'. The information about a rejected registration is contained in the modified response message ANT'.

Figure 10:
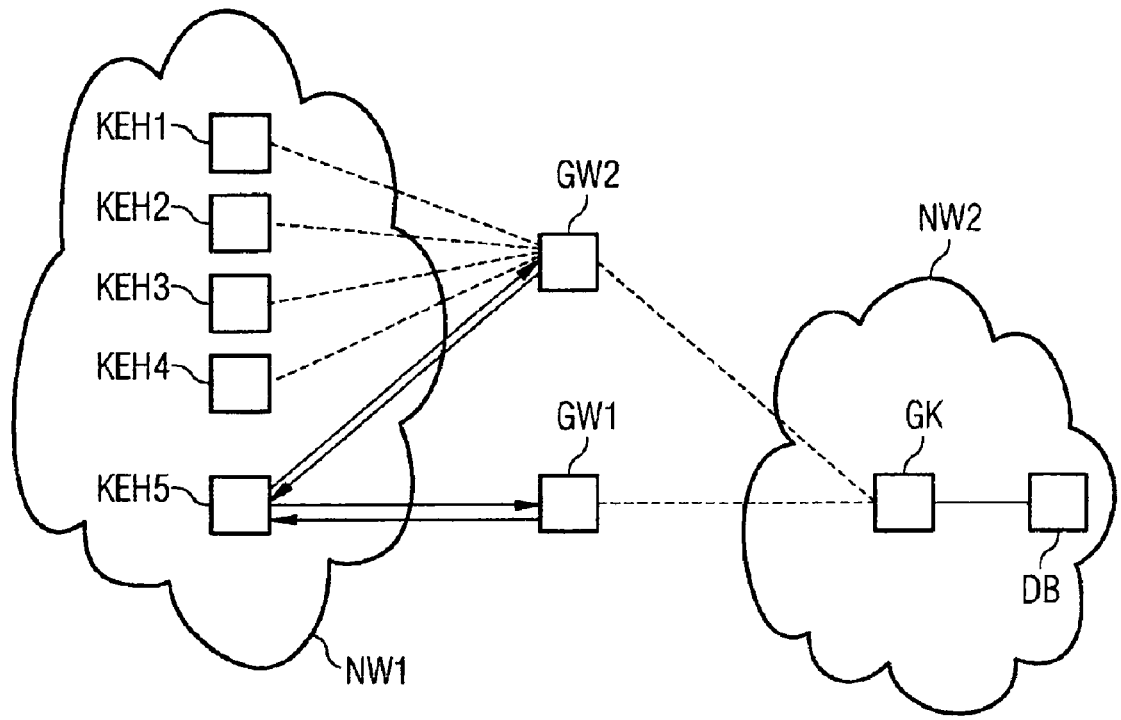

FIG. 10 shows a second exemplary embodiment of a communication system with parallel gateways GW1, GW2, each connected to a gatekeeper GK. A plurality of communication units KEH1, ... KEH4 are linked to the gateway GW2. Only a single communication unit KEH 5 is linked to the gateway GW1. The communication units KEH1, ... KEH4 as well as the communication unit KEH5 are located in a shared communication network NW1. The gatekeeper GK and the database DB are arranged in a communication network NW2.

In the brief description below it is assumed that a trust relationship already exists between the communication units KEH1, ... KEH4 and the gateway GW2. Equally it is assumed that trust relationships exist between the gatekeeper GK and the gateways GW1, GW2.

The communication unit KEH5 would now like to register in the communication system. To do this it can send a request message to both the gateway GW2 and also to the gateway GW1. As a result of its heavy load gateway GW2, after checking the authenticity of the request message of communication unit KEH5, sends a response message to this unit in which it rejects the forwarding of the request message to the gatekeeper GK. The communication unit KEH5 can now send a further request message to the gateway GW1 which takes over the handling of the request message. The rest of the process corresponds to the process described in conjunction with FIGS. 1 to 9.

Figure 11:
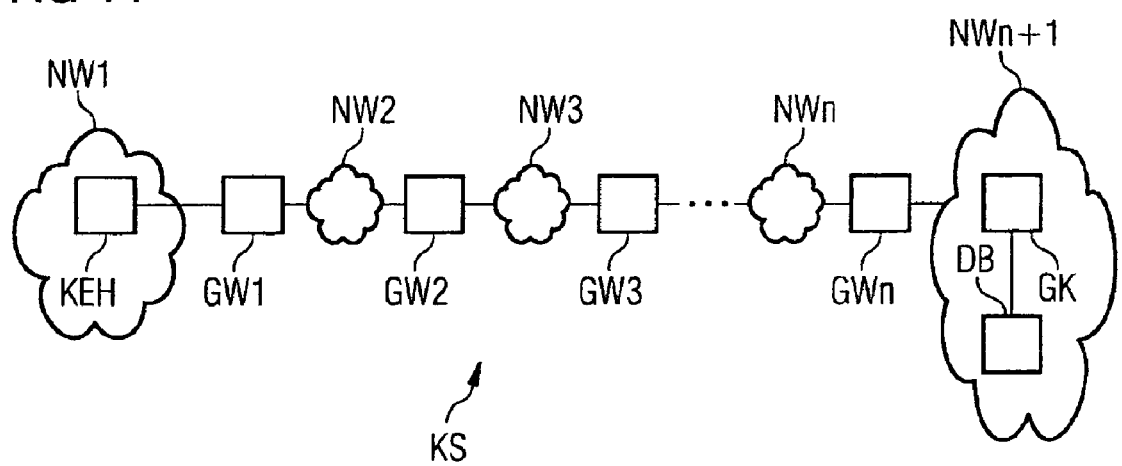
Figure 12:
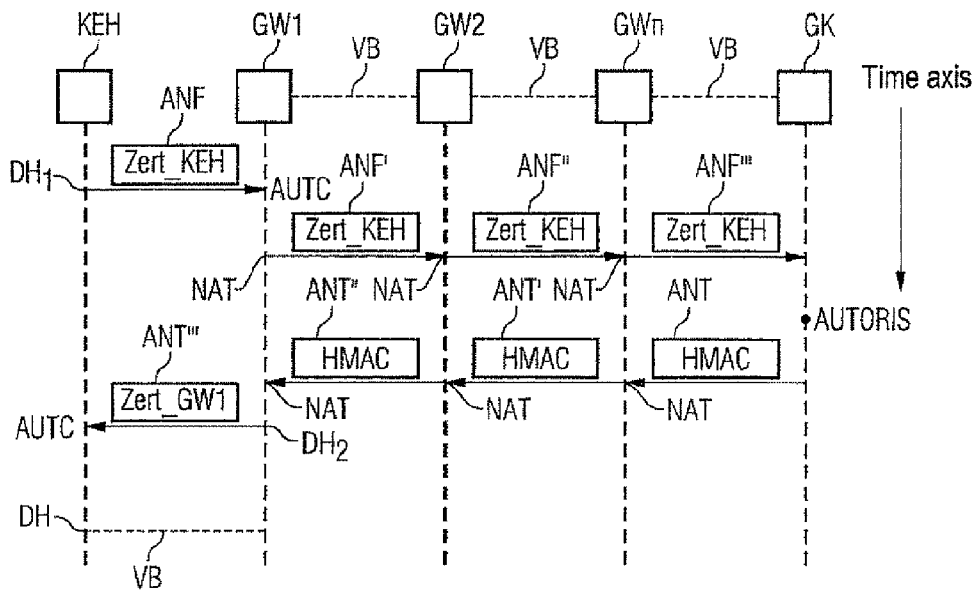

FIGS. 11 to 15 relate to a third exemplary embodiment of an inventive communication system which is shown in greater detail in FIG. 11. The outstanding feature of communication system KS is that it provides a plurality of gateways GW1, ... GWn. The plurality of gateways are in series between the communication unit KEH1 which is located in a first communication network NW1 and the gatekeeper GK which is located together with the database DB in a communication network NWn+1. Between each two gateways GW1, GW2; GW2, GW3; GWn-1, GWn is arranged a communication network NW2, NW3, ..., Nwn.

The sending of a request message ANF of the communication unit KEH over the plurality of gateways GW1, ... GWn to the gatekeeper GK is described with reference to FIG. 12. It is assumed that there is already a trust relationship VB between the relevant gateways GW1, ... GWn and between the gateway GWn and the gatekeeper GK. First of all a trust relationship must be established between the gateway GWn connected to the gatekeeper GK and the gatekeeper GK. The further setup of the trust relationship then takes place outwards from the gatekeeper GK. This method of operation makes it possible, when sending a majority of messages, to refer back to the simpler method in accordance with HMAC for integrity protection. The signing of a message by means of a certificate is then only necessary in each case in the first step between the registering communication element and the adjacent communication element.

The method of operation on registration of the communication is in principle identical to that described in connection with FIGS. 1 to 9. It is however explicitly pointed out that a check of the request message ANF for authentication is undertaken only in the gateway GW1 adjacent to the communication unit. If the outcome of the authentication is positive, the message is merely passed on to the gatekeeper with at least partial modification of data from the other gateways GW2, ..., GWn. The same applies to the transmission of the response message from the gatekeeper GK to the gateway GW1. Within this data path only the integrity is protected using HMAC, in which case the response message is modified by each gateway in the data path. The response message ANT''' is sent by the gateway GW1 to the communication unit KEH as described in FIG. 3.

Figure 13:
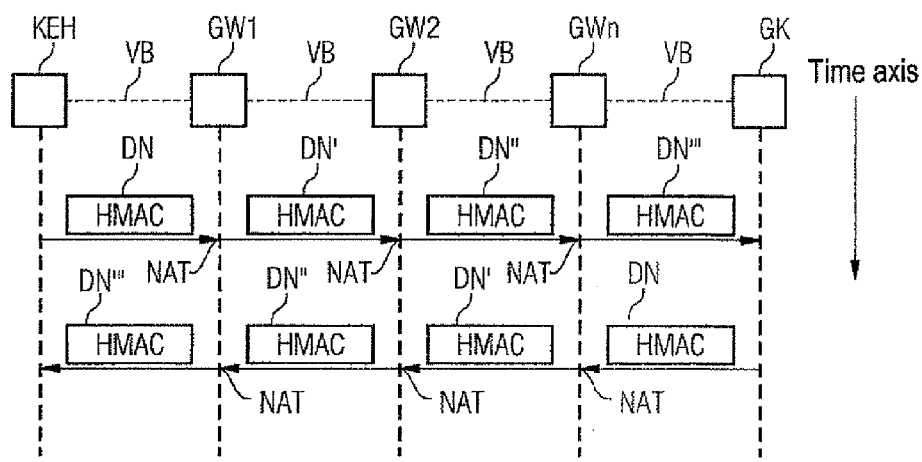

As a result of the trust relationship that now exists between the communication unit KEH and the gateway GW1, the integrity of data messages between the communication unit KEH and the gatekeeper GK can be protected using the simpler method with HMAC (FIG. 13).

Figure 14:
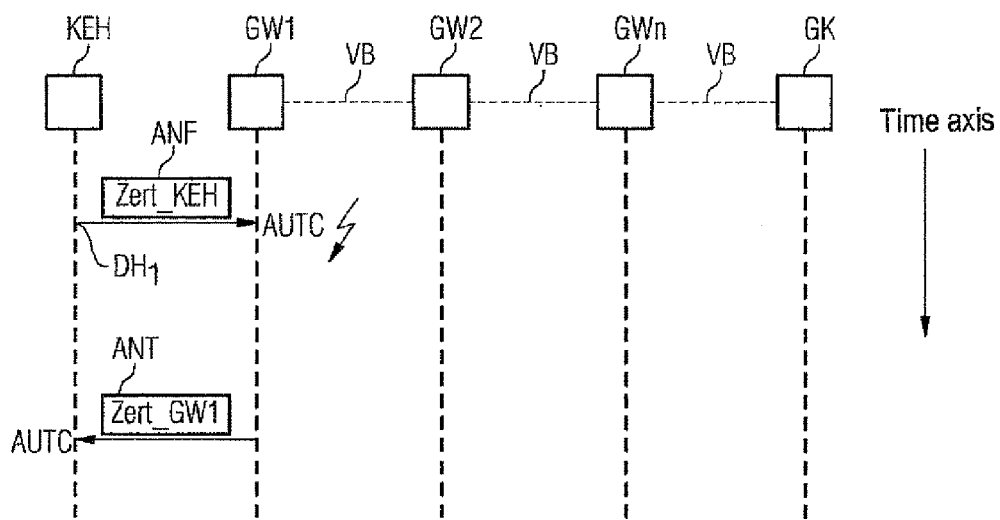
Figure 15:
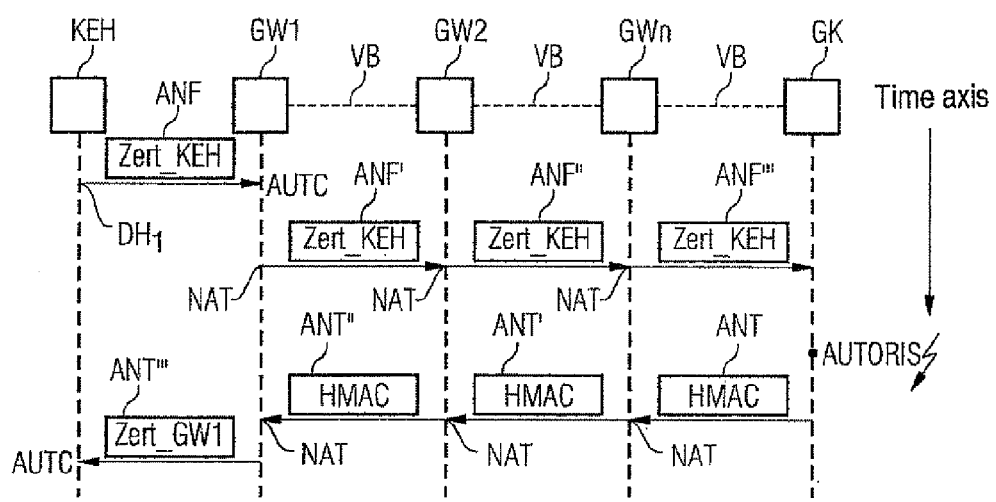

FIGS. 14 and 15 show failed registration attempts of the communication unit KEH in the communication system. Since the request message is checked for authenticity exclusively by gateway GW1, a negative check result in a response message ANT being returned immediately to the communication unit KEH. There is no modification and transfer of the request message ANF to one of the other gateways GW2, ..., GWn (FIG. 14).

In accordance with the exemplary embodiment shown in FIG. 15 the outcome of the authenticity has been positive, so that the request message ANF is transmitted modified by each gateway GW1, ... GWn to the gatekeeper GK. For the case where the authorization check has failed a response message is generated which is transmitted by means of the HMAC method to the gateway GW1. Since a registration is rejected by the gatekeeper GK no Diffie-Hellman halfset is added to the once more modified response message ANT'''. Thus it is not possible to establish a trust relationship between the communication unit and the gateway GW1.

In the exemplary embodiment described the gatekeeper is formed by one computer. Alternatively the gatekeeper can also be divided up over a number of computers.

The invention claimed is:

1. A communication system, comprising:
   a plurality of communication elements, comprising:
      a gatekeeper residing in a first network,
      a gateway connected to the gatekeeper, and
      a communication unit residing in a second network, the communication unit connected to the gateway,
   a request message is sent from the communication unit to the gatekeeper via the gateway in order to establish a trust relationship between the communication unit and the gateway,
   wherein the gateway checks the authenticity of the request message from the communication unit,
   wherein the gateway forwards the request message to the gatekeeper after the request message is verified as authentic,
   wherein the gatekeeper checks that the communication unit is authorized at the gatekeeper in response to receiving the forwarded request message, and
   wherein when the communication unit is authorized:
      the gatekeeper sends a first response message to the gateway indicating a positive authorization, and
      the gateway receives the first response message and sends a second response message to the communication unit in response to receiving the first response message, the second response message indicating a positive authorization,
   wherein the trust relationship is established between the communication unit and the gateway as a result of the request message being verified as authentic and of the communication unit being verified as authorized, and wherein the first communication network and the second communication network are different networks.

2. The communication system in accordance with claim 1, wherein a subsequent message is sent from the communication unit to the gatekeeper after the message being verified as authentic and after the positive authorization, the subsequent message sent using a simple cryptographic method.

3. The communication system in accordance with claim 1, wherein the plurality of communication elements further comprises a further communication unit residing in a third network, the further communication unit connected to the communication unit, the communication unit is a further gateway which is connected with a further communication unit or wherein the communication unit is a computer.

4. The communication system in accordance with claim 3, wherein a trust relationship exists between each of the plurality of communication elements that are connected.

5. The communication system in accordance with claim 4, wherein each trust relationship exists after an authentication and authorization and each trust relationship is represented by a password or a secret formed by the Diffie-Hellman method.

6. The communication system in accordance with claim 3, wherein when a trust relationship does not yet exist between two of the plurality of communication elements that are connected, a message is transmitted using a digital certificate between the two of the plurality of communication elements that are connected.

7. The communication system in accordance with claim 6, wherein each of the plurality of communication elements has a personal certificate and a private key.

8. The communication system in accordance with claim 7, wherein each of the plurality of communication elements has a root certificate with which the personal certificate of the connected communication element is signed.

9. The communication system in accordance with claim 3, wherein each of the plurality of communication elements only knows the address of the communication element connected to it.

10. The communication system in accordance with claim 1, wherein a trust relationship exists:
between each two connected communication elements from the plurality of communication elements, and
after an authentication and authorization.

11. A method for registering a communication relation in a communication system having a plurality of communication elements, the plurality of communication elements including a gatekeeper in a first communication network, a gateway connected a second communication network to the gatekeeper, and a communication unit connected to the gateway, the method comprising:
transmitting a request message from the communication unit to the gatekeeper via the gateway in order to establish a trust relationship between the communication unit and the gateway;
performing an authentication of the request message by the gateway;
forwarding the request message to the gatekeeper when the outcome of the authentication is positive;
checking authorization of the communication unit by the gatekeeper in response to gatekeeper receiving the forwarded message;
transmitting a response message to the communication unit sending the request message; and
establishing a trust relationship between the communication unit and the gateway after a positive authentication of the request message at the gatekeeper and a positive authorization of the communication unit at the gateway;
sending a subsequent message after the establishing the trust relationship between the communication unit and the gateway, the subsequent message sent from the communication unit to the gatekeeper using a simple cryptographic method,
wherein the first communication network and the second communication network are different networks.

12. The method according to claim 11, wherein the trust relationship established between the gateway and the gatekeeper includes sending an earlier request message from the gateway to the gatekeeper, authenticating the earlier request message by the gatekeeper and authorizing the gateway by the gatekeeper, wherein a trust relationship between the gateway and the gatekeeper is established after a positive authentication of the earlier request message and a positive authorization of the gateway.

13. The method according to claim 11,
wherein when a trust relationship does not exist between two of the communication elements that are connected, data is transmitted between the respective elements using a certificate, and
wherein when a trust relationship exists between two of the communication elements that are connected, data is transmitted between the respective elements using a secret or a password.

14. The method according to claim 11,
wherein the plurality of communication elements include a plurality of gateways connected serially between the communication unit and the gatekeeper, and
wherein the authentication of the request message is in the gateway connected to the communication unit and authorization of the communication unit is in the gatekeeper.

15. The method according to claim 14, wherein a trust relationship is established between each of the connected elements, beginning with the gateway connected to the gatekeeper.

16. The method according to claim 11,
wherein the gateway modifies the request message by:
using a Network Address Translation to convert an IP address,
modifying a checksum in the request message using the converted IP address, and
wherein the modified request message is forwarded.

17. The method according to claim 11, wherein the request message sent by the communication element includes the gateway as a destination of the message,
wherein the gateway modifies the request message prior to the forwarding of the modified message, and
wherein the modified message includes the gatekeeper as the destination of the message.

18. A method for registering a communication relation in a communication system having a plurality of communication elements, the plurality of communication elements including a gatekeeper in a first network, a gateway connected to the gatekeeper in a second network, and a communication unit connected to the gateway, the method comprising:
transmitting a request message from the communication unit to the gatekeeper via the gateway in order to establish a trust relationship between the communication unit and the gateway;
performing an authentication of the request message by the gateway;

forwarding the request message to the gatekeeper when the outcome of the authentication is positive;

checking authorization of the communication unit by the gatekeeper in response to gatekeeper receiving the forwarded message;

transmitting a response message to the communication unit sending the request message; and establishing a trust relationship between the communication unit and the gateway after a positive authentication of the request message at the gatekeeper and a positive authorization of the communication unit at the gateway, wherein the first communication network and the second communication network are different networks.

* * * * *